(12) United States Patent
Izawa (10) Patent No.: US 6,302,553 B1
(45) Date of Patent: Oct. 16, 2001

(54) RADIATING DIRECTION CONTROL UNIT OF LIGHTING DEVICE FOR VEHICLE USE

(75) Inventor: Makoto Izawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/360,637

(22) Filed: Jul. 26, 1999

(30) Foreign Application Priority Data

Aug. 24, 1998 (JP) .................................................. 10-236937

(51) Int. Cl.[7] ....................................................... B60Q 1/10
(52) U.S. Cl. ............................ 362/37; 362/464; 362/465; 362/466; 362/467; 362/271; 362/275; 362/476; 362/469; 362/30; 362/40
(58) Field of Search ..................................... 362/464, 465, 362/466, 467, 271, 272, 275, 476, 469, 37, 39, 40

(56) References Cited

U.S. PATENT DOCUMENTS

| | | | |
|---|---|---|---|
| 4,868,720 | * | 9/1989 | Miyauchi et al. ....................... 362/69 |
| 5,877,680 | * | 3/1999 | Okuchi et al. ......................... 340/468 |
| 6,010,237 | * | 1/2000 | Gotou ..................................... 362/460 |
| 6,176,590 | * | 1/2001 | Prevost et al. ........................... 362/37 |
| 6,183,118 | * | 2/2001 | Toda et al. ............................. 362/465 |
| 6,193,398 | * | 2/2001 | Okuchi et al. ......................... 362/466 |
| 6,234,654 | * | 5/2001 | Okuchi et al. ......................... 362/466 |

FOREIGN PATENT DOCUMENTS

| | | | |
|---|---|---|---|
| 0 845 388 | | 6/1998 | (EP) .............................. B60Q/1/115 |
| 0 847 895 | | 6/1998 | (EP) .............................. B60Q/1/115 |

* cited by examiner

*Primary Examiner*—Stephen Husar
*Assistant Examiner*—Anabel Ton
(74) *Attorney, Agent, or Firm*—Sughrue, Mion, Zinn, Macpeak & Seas, PLLC (57) ABSTRACT

A radiating direction control unit 1 of a lighting device for a vehicle for controlling a radiating direction of the lighting device 6 in accordance with the pitch angle of the vehicle. The radiation direction control unit includes an axle level detector 2 which detects a change in the level of a front or a rear axle of the vehicle, and a vehicle inclination detector 3 for detecting an inclination of the vehicle in the transverse direction. A pitch angle of the vehicle is determined based on respective signals emitted by the axle level detector and the vehicle inclination detector. A radiation direction controller corrects a radiating direction of the lighting device only when a change in the inclination of the vehicle in the transverse direction is not detected by the inclined attitude detection means 3. Accordingly, the radiating direction of the lighting device 6 is not changed due to a change in the vehicle attitude which does not affect the pitch angle of the vehicle.

20 Claims, 8 Drawing Sheets

IN THE CASE OF TURNING TO THE RIGHT

IN THE CASE OF TURNING TO THE LEFT

RADIATING DIRECTION CONTROL UNIT OF LIGHTING DEVICE FOR VEHICLE USE

BACKGROUND OF THE INVENTION

1. Field of the Invention

The present invention relates to a radiating direction control unit of a lighting device for vehicle use in which a change in the level of a front or rear wheel axle is detected and a radiating direction of the lighting device for vehicle use is controlled according to a change in an attitude of the vehicle.

2. Related Art

There is known an automatic leveling device, which is a device for automatically correcting a radiating direction of a beam of light emitted from a lighting device (head lamp) incorporated into a vehicle so that the radiating direction of a beam of light can be kept in a predetermined direction at all times.

For example, an automatic leveling device, in which one vehicle leveling sensor is used, is composed as follows. There is provided a leveling sensor in one of the axles of a front and a rear wheel. A change in the level of the axle concerned is detected, and a change in the pitch angle of the vehicle body is estimated by the change in the level. A reflecting mirror arranged in a head lamp is driven so that the change in the level can be canceled. In this way, the radiating direction of the lighting device and the height of a cut line on a light distribution pattern can be controlled. In this device, it is a precondition that the pitch angle of a vehicle can be explicitly determined with respect to a change in the level of the axle which is detected by one vehicle leveling sensor.

However, in the conventional device, the following problems may be encountered. In the case where a change in the level is caused which does not affect the pitch angle in the running attitude of a vehicle, for example, in the case where the vehicle is turned and rolling occurs in the vehicle, the leveling sensor detects a change in the level of the axle, and a radiating direction of the lighting device is changed by the detected change in the axle. In this case, the radiation angle is controlled not in accordance with a change in the pitch angle of the vehicle.

For example, when the leveling sensor is attached to a left rear axle, the level of a left rear wheel is increased in the case where the vehicle is turning to the left. When it is erroneously recognized that this change is the same as that of a case in which a front portion of the vehicle is lowered, that is, when it is erroneously recognized that this change is a nose dive, the radiating direction of the lighting device is controlled so that this change can be canceled. That is, the radiating direction of the lighting device is controlled so that the radiating direction of the lighting device is controlled upward with respect to a horizontal face. Accordingly, there is a possibility that a beam of light directed upward at this time causes a glare in an opposed car. When the vehicle is turning to the right, the level of the left axle is lowered. Therefore, it is erroneously recognized that this change is the same as that in the case where the front portion of the vehicle is shifted upward. In this case, the radiating direction of the lighting device is controlled downward with respect to a horizontal face. Therefore, visibility of the vehicle is lowered in this case. That is, there is a possibility that safety of driving is impaired.

SUMMARY OF THE INVENTION

It is a task of the present invention to properly conduct controlling of the radiating direction of a lighting device for vehicle use when the pitch angle of a vehicle is changed.

In order to solve the above problems, the present invention provides a radiating direction control unit of a lighting device for vehicle use comprising: a vehicle level detecting means for detecting a change in the level of an axle section of a front or a rear wheel of a vehicle, a pitch angle of the vehicle being found from a vehicle level detecting signal obtained by the vehicle level detecting means, a radiating direction of the lighting device being changed according to a change in an attitude of the vehicle; an inclined attitude detection means for detecting an inclination of the vehicle in the transverse direction; and a radiation control means for correcting a radiating direction of the lighting device according to a change in the pitch angle of the vehicle based on the vehicle level detecting signal sent from the vehicle level detecting means only when a change in the inclination in the transverse direction of the vehicle is not detected by a signal sent from the inclined attitude detection means.

According to the present invention, only when the vehicle is not inclined in the transverse direction, the radiating direction of the lighting device is corrected with respect to a change in the pitch angle of the vehicle according to the vehicle leveling signal.

DETAILED DESCRIPTION OF THE PREFERRED EMBODIMENTS

A preferred embodiment of the present invention will now be described with reference to the accompanying drawings.

Figure 1:
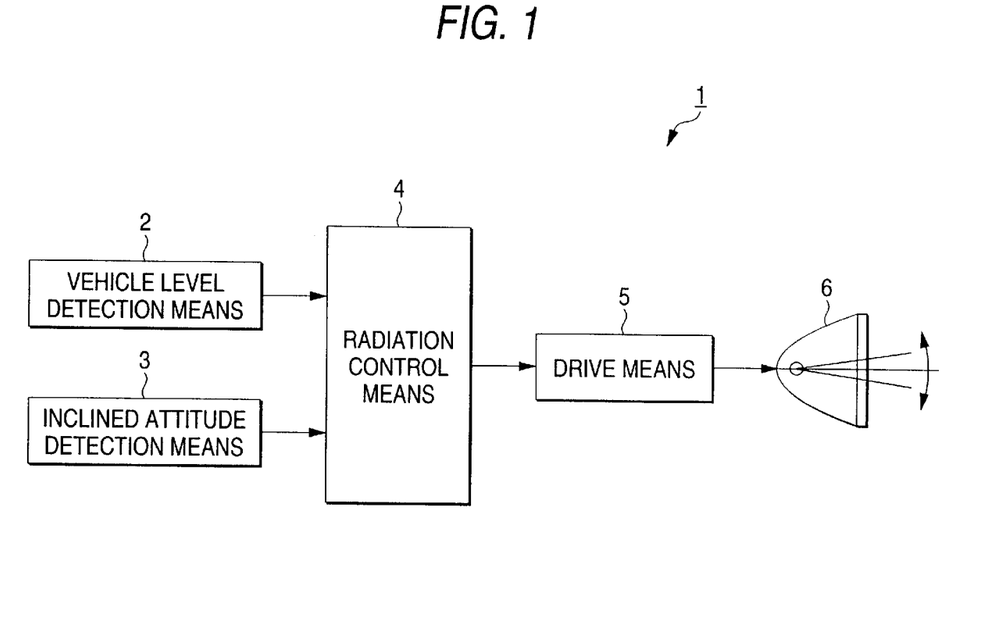
FIG. 1 is a block diagram showing the basic constitution of the present invention.

FIG. 1 is a view showing the fundamental constitution of the device according to the present invention.

The radiating direction control unit 1 includes: a vehicle level detecting means 2, an inclined attitude detecting means 3, a radiation control means 4 and a drive means 5. According to the vehicle level detecting signal sent from the vehicle level detecting means 2, the pitch angle of the vehicle (pitching angle) is found, and the radiating direction of the lighting device 6 is changed according to a change in the attitude in the longitudinal direction of the vehicle. In this connection, examples of the lighting device 6, the radiating direction of which is controlled by the radiation control means 4 via the drive means 5 are: a head lamp, fog lamp and cornering lamp which are used as lighting devices for automobile use.

The vehicle level detecting means 2 is arranged to detect a change in the level of one of the axles of the front and the rear wheel. The vehicle level detecting signal obtained by the vehicle level detecting means 2 is a piece of fundamental information which is used for finding a stopping attitude and a running attitude of the vehicle. For example, the following methods are used to detect the level of the vehicle.

One example is a method in which a distance between the vehicle level detecting means 2 and a road surface is measured by using detection waves such as ultrasonic waves or laser beams. Another example is described as follows. As the vehicle level detecting means 2 for detecting a vertical movement of the axle of the front or the rear wheel, there is provided a vehicle level sensor which detects an amount of extension and contraction of the suspension.

The inclined attitude detecting means 3 is provided for detecting an inclination of the vehicle in the transverse direction. The detection signal obtained by the inclined attitude detecting means 3 is used as a piece of fundamental information for judging whether or not a change in the pitch angle of the vehicle is detected, that is, whether or not the vehicle level detecting signal is originated from a change in the vehicle level which does not affect the pitch angle of the vehicle.

For example, the inclined attitude detecting means 3 can detects whether or not the vehicle is turning by using one of the following detecting methods:

(1) the method of detecting the speeds of a right and a left wheel;

(2) the method of detecting the steering angle of a steering wheel;

(3) the method of detecting the acceleration in the transverse direction given to a vehicle; and (4) the method of detecting a rolling angle or yawing angle of the vehicle.

First, according to method (1), a turning condition of a vehicle is grasped by detecting a difference of speed between the right and the left wheel. When a vehicle is running straight, there is no difference of speed between the right and the left wheel or there is a difference of speed which is smaller than a threshold value. When the vehicle is turning, the difference of speed between the right and the left wheel becomes larger than the threshold value. Therefore, it is possible to judge a running attitude of the vehicle.

According to method (2), a steering angle of the steering wheel is detected. When the vehicle is running straight, the steering angle is smaller than a threshold value. When the vehicle is turning, the steering angle becomes larger than the threshold value. Due to the foregoing, it is possible to judge a running attitude of the vehicle.

According to method (3), an acceleration given to the vehicle in the transverse direction is detected by an acceleration detecting means. When the vehicle is running, the acceleration given to the vehicle in the transverse direction is lower than a threshold value. When the vehicle is turning, the acceleration given to the vehicle in the transverse direction becomes higher than the threshold value by the influence of a centrifugal force. Due to the foregoing, it is possible to judge a running attitude of the vehicle.

According to method (4), in order to detect the rolling angle, the yawing angle or both of them, for example, an angular sensor or a gyro-sensor is arranged in the vehicle, and it can be judged by a change in the rolling angle or the yawing angle whether the vehicle is running straight or turning.

The radiation controlling means 4 receives detection signals from the vehicle level detecting means 2 and the inclined attitude detecting means 3, and corrects a radiating direction of the lighting device 6 according to a change in the pitch angle. Its control signal is sent to the drive means 5.

At this time, the radiation controlling means 4 controls a radiating direction of the lighting device 6 according to the result of the detection of a change in the inclination of the vehicle in the transverse direction by a signal sent from the inclined attitude detecting means 3.

In the case where an inclination in the transverse direction is not detected, that is, in the case where the inclination angle is smaller than a threshold value, a radiating direction of the lighting device 6 is corrected by the radiation controlling means 4 according to a change in the pitch angle of the vehicle which is based on a vehicle level detecting signal sent from the vehicle level detecting means 2. In other words, a change in the radiating direction of the lighting device 6 originated from a change in the pitch angle of the vehicle is canceled, so that the radiating direction can be controlled to be in a predetermined direction.

Concerning the method of calculating the pitch angle of the vehicle, the following method is adopted. For example, according to a detection signal of the vehicle level detecting means 2, a stopping attitude of the vehicle is calculated. At the same time, according to the stopping attitude, a correlation between the running attitude of the vehicle and the detection signal of the vehicle level detecting means 2 is determined so that the running attitude of the vehicle can be calculated by the detection signal of the vehicle level detecting means 2. According to this method, the calculation is conducted as follows.

When a change in the level of the axle is "Δh" and a pitch angle in the case where the vehicle stops is "p", a relation between them is approximated to a linear expression "p=a·Δh+b", wherein "a" and "b" are constants. Then, Δh=Δh0, which is obtained by detecting the vehicle level in the case where the vehicle is stopped, is substituted in the above linear expression, and an expression "p0=a·Δh+b" is obtained. A pitch angle (p0) showing the stopping attitude is found by "p0=a·Δh0+b". When a pitch angle in the case where the vehicle is running is "P", a relation between P and Δh is approximated to a linear expression "P=A·Δh+B", wherein A and B are constants. Since a straight line expressed by this expression passes through a point (Δh0, p0), value B can be determined (B=p0−A·Δh0), and inclination A is substantially constant irrespective of a condition of a load carried by the vehicle. Due to the foregoing, when Δh detected by the vehicle level detection in the case where the vehicle is running is substituted in the linear expression "P=A·Δh+B", it is possible to calculate a pitch angle (P) expressing a running attitude. Due to the foregoing, when only one vehicle level detecting means is provided in one of the front and the rear axle, it is possible to calculate and estimate a pitch angle of the vehicle.

When an inclination in the transverse direction of the vehicle is detected, that is, when an inclination angle is not less than the threshold value, one of the following three items (I) to (III) may be selected.

(I) Stoppage of the control of a radiating direction or reduction in the response speed of the control;

(II) Control according to average processing of vehicle level detection signals; or (III) Control for canceling a change in the radiating direction originated from a change in the vehicle level detecting signal.

Item (I) is described as follows. Control of the radiating direction of the lighting device 6 is stopped by the radiation control means 4, so that radiating direction control of the lighting device 6 is stopped with respect to the pitch angle found by the change in the vehicle level. Alternatively, the response property of control of the radiating direction is intentionally lowered, so that control conducted on the change in the pitch angle can be suppressed. It can be said that when the response property of control is ultimately lowered, control is finally stopped.

According to item (II), a pitch angle is found which corresponds to an average of the vehicle level detection signals obtained until that time, and the radiating direction of the lighting device 6 is corrected according to the pitch angle. In this case, "average" includes a simple time average, a moving average, and a weighted average which is multiplied by a weighting coefficient, the value of which is determined by whether the vehicle level detection signal is a close signal or the vehicle level detection signal is a remote signal from the viewpoint of time.

According to item (III), the radiating direction of the lighting device 6 is corrected so that the change in the radiating direction of the lighting device corresponding to the pitch angle of the vehicle found by the vehicle level signal, which has been obtained in the case where the vehicle is turning, can be canceled. For example, when the vehicle level sensor is attached to the left rear wheel section, the level of the left rear wheel section is increased when the vehicle is turning to the left, and the radiating direction of the lighting device is controlled upward as it is. In order to prevent the radiating direction of the lighting device from being controlled upward, it is necessary to cancel the change, and correction is conducted so that the radiating direction can not be changed upward. When the vehicle is turning to the right, the level of the left rear wheel section is lowered, and the radiating direction of the lighting device is controlled downward as it is. In order to prevent the radiating direction of the lighting device from being controlled downward, it is necessary to cancel the change, and correction is conducted so that the radiating direction can not be changed downward.

When one of the above described methods (1) to (4) for determining whether or not the vehicle is turning is used alone, or when some of the above described methods (1) to (4) are used in combination, the inclined attitude detection means 3 detects whether or not the vehicle is turning. When the vehicle is turning, control described in one of above items (I) to (III) can be adopted. In this connection, when the controlling method is selected, it is unnecessary to adopt a constant method at all times. It is possible to appropriately select one of the items (I) to (III) according to the running condition of the vehicle, wherein the condition of the vehicle is determined by the pieces of information obtained by the vehicle speed detecting means or the acceleration detecting means.

The radiating direction of the lighting device 6 is controlled by a control signal sent from the radiation control means 4 to the driving means 5. Concerning the method of controlling the radiating direction of the lighting device 6, it is possible to adopt a method in which an overall beam of radiation light is directed in a predetermined direction, and also it is possible to adopt a method in which a portion of a beam of radiation light is directed in a predetermined direction. Concerning the former method, for example, when the entire lighting device is rotated round the rotating axis, the direction of the radiation axis of the lighting device is changed. Alternatively, when an attitude of a component of the lighting device, such as a reflecting mirror, lens, light source, or light shielding member, is controlled, it is possible to change a direction of an optical axis of the optical system. Concerning the latter method, in order to partially change the radiating direction, it is possible to adopt a method in which only a radiating axis of a specific lighting device in an apparatus composed of a plurality of lighting devices is changed. For example, in an automobile in which a head lamp, fog lamp and cornering lamp are arranged, only a radiating axis of one of the three lamps or only radiating axes of two of the three lamps are changed. Alternatively, it is possible to adopt a method in which an attitude of one of the components of the lighting device is controlled or attitudes of a plurality of components of the lighting device are controlled. For example, reflecting mirrors are composed of a stationary reflecting mirror and a movable reflecting mirror, and an optical axis of the movable reflecting mirror is directed to a desired direction.

According to the present invention, even when a change in the level, which is caused by the influence of rolling in the case where the vehicle is turning, is detected in the axle arranged in the front or at the rear of a vehicle, it is possible to control in such a manner that an unnecessary radiating direction controlling operation of the lighting device can not be conducted with respect to a change which does not affect the pitch angle of the vehicle.

FIGS. 2 to 8 are views showing an embodiment in which the present invention is applied to a radiating direction control unit, which is an automatic leveling device of a lighting device for automobile use.

Figure 2:
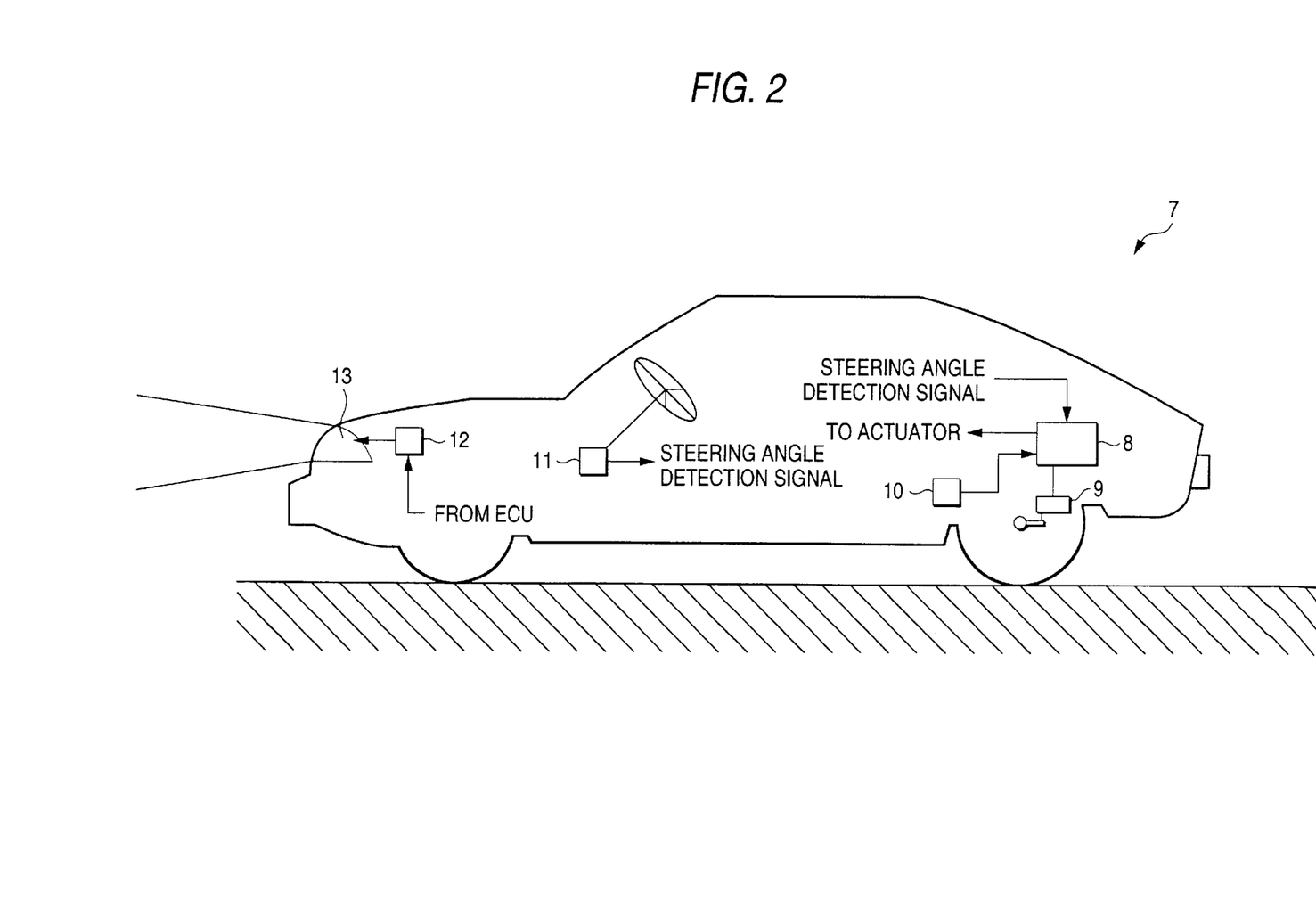
FIG. 2 is a view showing an example of an arrangement of an automatic leveling device used for an automobile in accordance with an embodiment of the present invention.

FIG. 2 is a schematic illustration showing an outline of an arrangement of the radiating direction control unit 7 in a vehicle. At the rear of the vehicle, there is provided ECU (electronic control unit) 8 which is a controller for the radiating direction control unit 7. Detection signals of the vehicle level sensor 9, vehicle speed sensor 10, and steering sensor 11 are inputted into ECU 8.

The vehicle level sensor 9 corresponding to the vehicle level detecting means 2 is attached to a left rear wheel section of an automobile. A sensor provided for an electronically controlled air suspension of the rear wheel is used as the vehicle level sensor 9. A sensor provided for ABS (anti-skid brake system) of the rear wheel is used as the vehicle speed sensor (vehicle speed detecting means) 10. The steering sensor 11 corresponds to the inclined attitude detecting means 3 and detects a steering angle of the steering wheel.

A control signal of ECU 8 is sent to the actuator 12, and radiating direction control is conducted on the head lamp 13. In this connection, only the actuator and the head lamp arranged on the left of the vehicle body are shown in FIG. 2.

Figure 3:
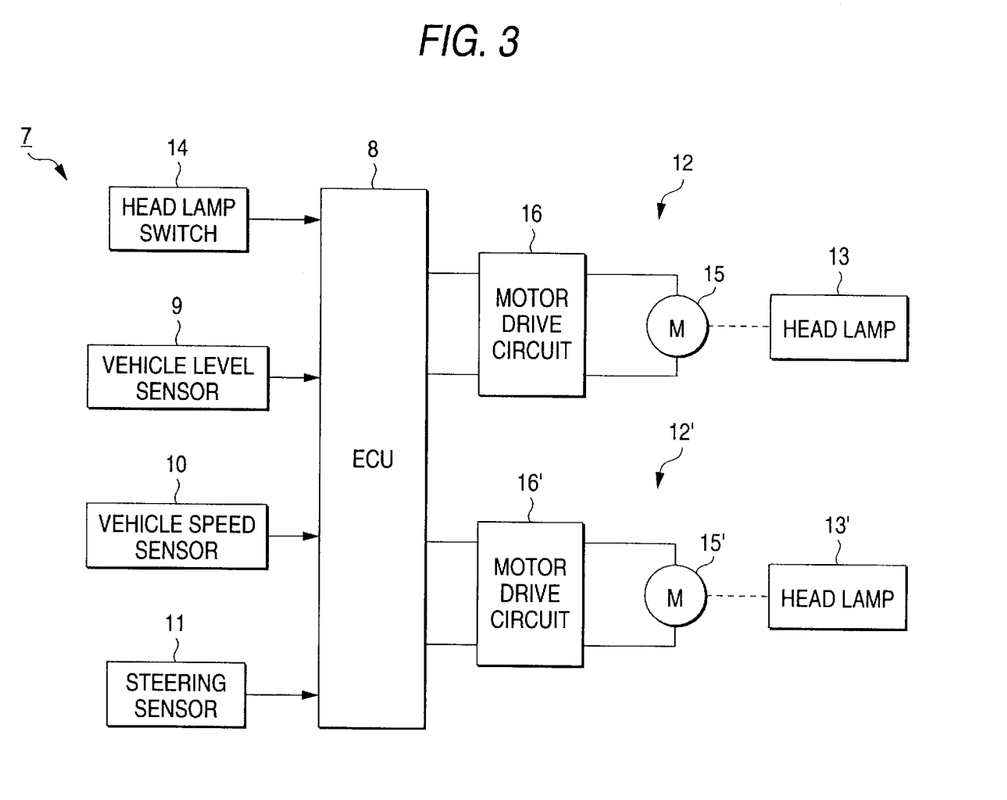
FIG. 3 is a block diagram showing an arrangement of a device.

FIG. 3 is a view showing a constitution of the radiating direction control unit 7. An indication signal of turning on and off the head lamp switch 14 is inputted into ECU 8 into which a microcomputer is incorporated, and also detection signals of the vehicle level sensor 9, vehicle speed sensor 10 and steering sensor 11 are inputted into ECU 8.

An actuator 12 (12') corresponding to the driving means 5 includes a motor driving circuit 16 (16') for controlling the rotation of a stepping motor 15 (15') according to a control signal sent from ECU 8. In this connection, an actuator 12' is provided for the head lamp 13' arranged on the right of the vehicle. The actuator 12' includes a stepping motor 15' and a motor driving circuit 16'.

The actuator 12 (12') is controlled so that a radiating direction of each head lamp 13 (13') can be directed in a desired direction when a reflecting mirror in the head lamp 13 (13') is tilted on a perpendicular face including its optical axis by the actuator.

Figure 4:
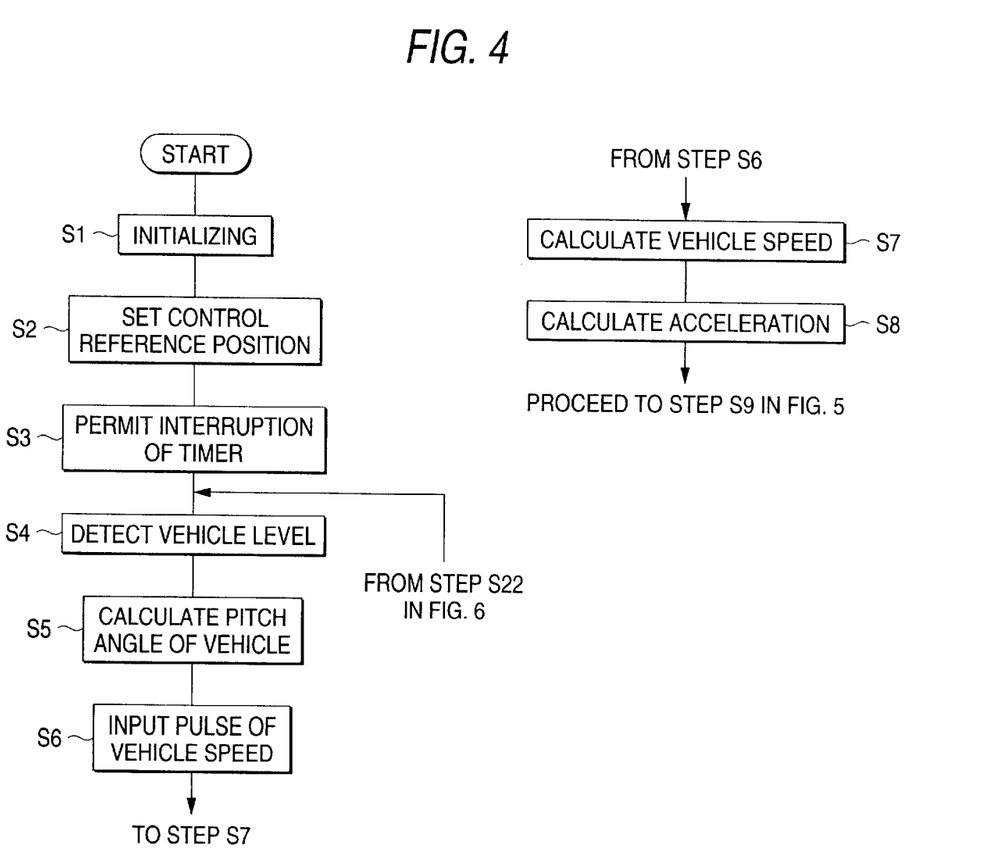
FIG. 4 is a flow chart showing an example of a beginning part of the control procedure in accordance with the present invention.
Figure 5:
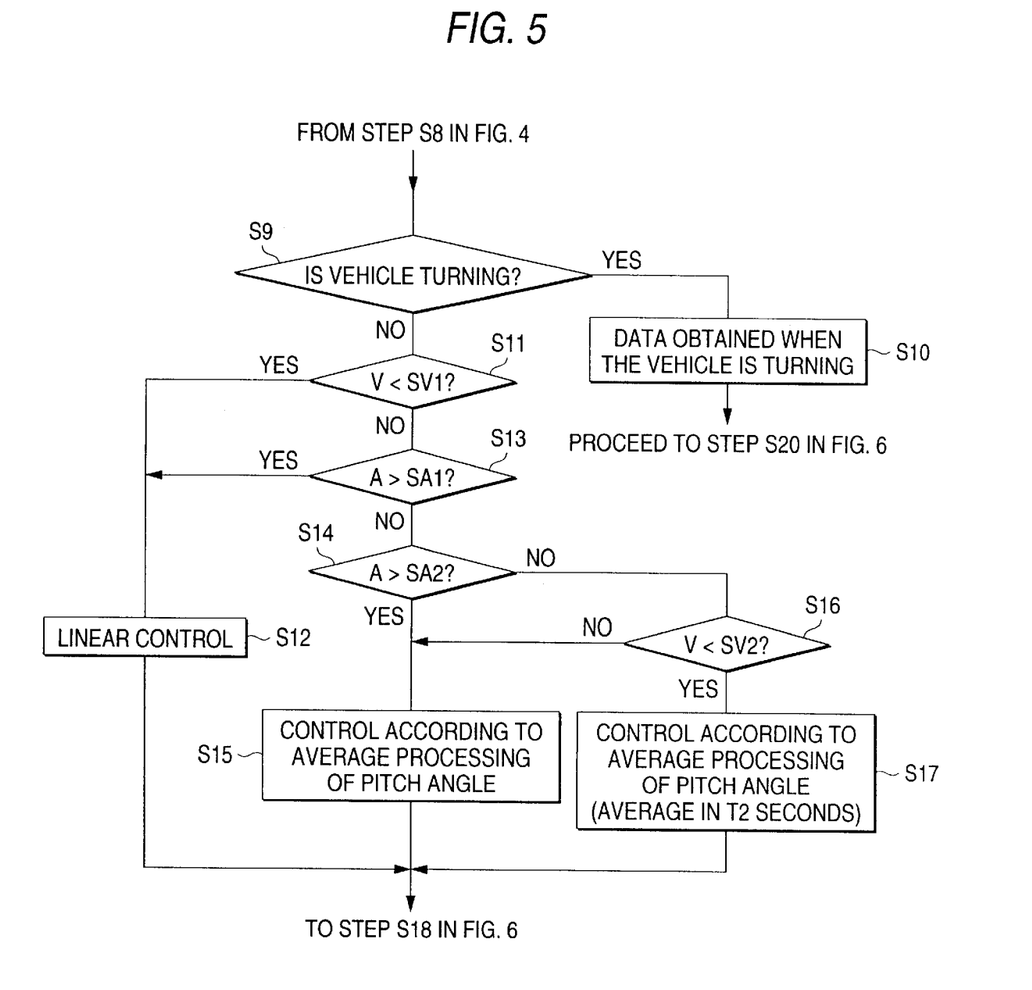
FIG. 5 is a flow chart showing an intermediate portion of the control procedure in accordance with the present invention.
Figure 6:
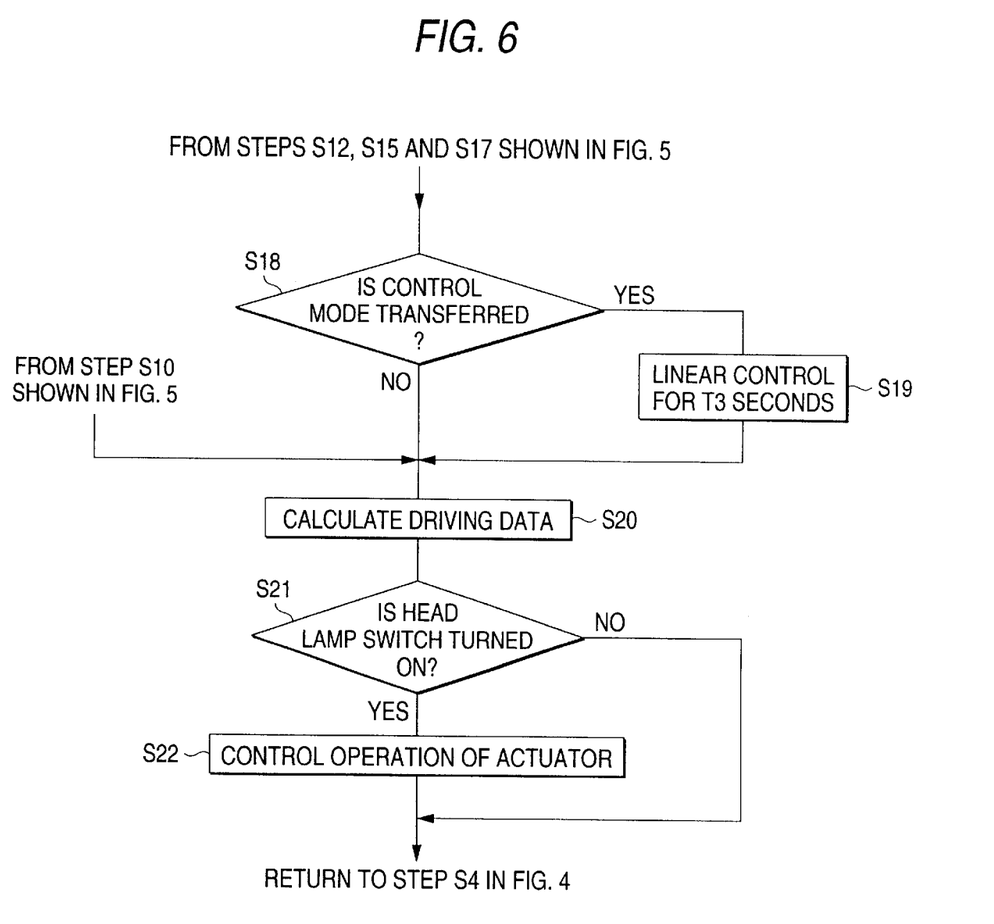
FIG. 6 is a flow chart showing an end portion of the control procedure in accordance with the present invention.

FIGS. 4 to 6 are flow charts showing a flow of the main processing conducted in ECU 8. First, in step S1 shown in FIG. 4, I/O port (input and output port) and memory are initialized. After that, in step S2, a reference position of control is set. That is, an initializing position of the actuator 12, 12' is set.

Then, the program proceeds to step S3, and a timer interruption with respect to CPU (central processing unit) arranged in ECU 8 is allowed. After that, in the next step S4, vehicle level detection is conducted. That is, a vehicle level detecting signal obtained by the vehicle level sensor 9 is taken into ECU 8.

In step S5, a pitch angle of the vehicle is calculated according to the vehicle level detecting signal. After that, in the next step S6, a detecting signal (pulse signal) sent from the vehicle speed sensor 10 is taken into ECU 8. This is conducted by an interruption processing.

In step S7, a vehicle speed, which is represented by "V" hereinafter, is found by vehicle speed calculation. In the next step S8, an acceleration, which is represented by "A" hereinafter, is calculated by differential operation. Then, the program proceeds to step S9 shown in FIG. 5. In this connection, an acceleration is calculated in such a manner that a change in speed is divided by an interval of time required for the change.

In step S9, whether or not the vehicle is turning is judged according to a detection signal sent from the steering sensor 11. When the vehicle is turning, the program proceeds to step S10, and when the vehicle is not turning, the program proceeds to step S11.

In step S10, data obtained when the vehicle is turning is processed. In this embodiment, the above item (III) is used.

Figure 7:
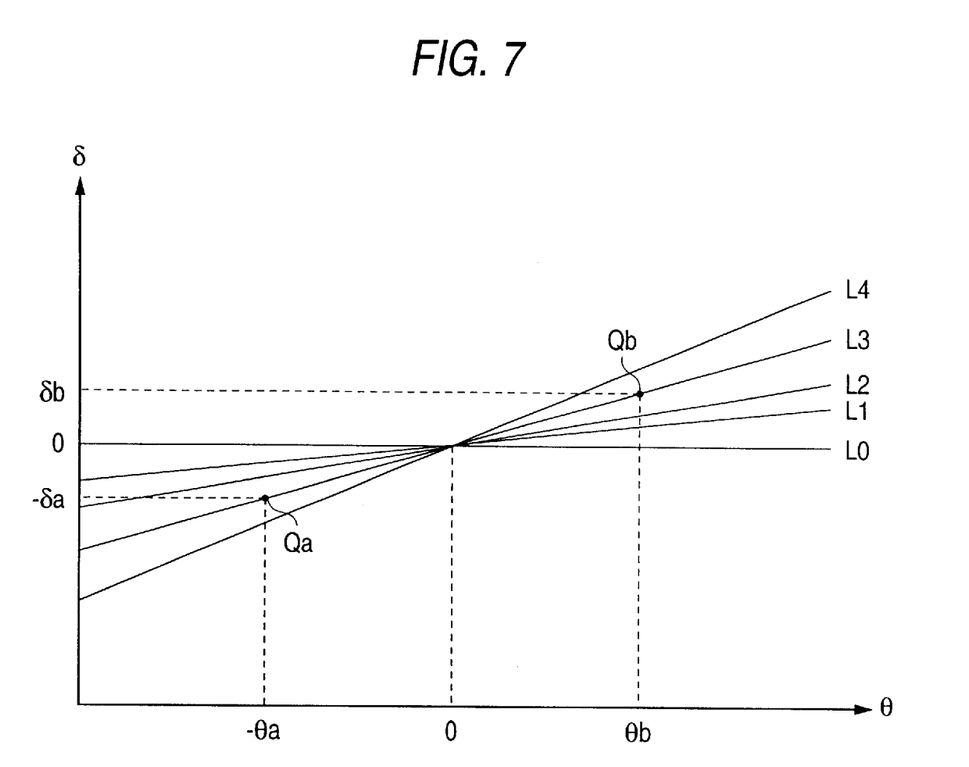
FIG. 7 is a graph showing a relation between the tilting angle θ of a rear axle and the correction radiating angle δ in the radiating direction of a head lamp.

FIG. 7 is a graph, the horizontal axis of which represents an inclination angle "θ" of the rear axle and the vertical axis of which represents a corrected radiation angle "δ" with respect to the radiating direction of the head lamp 13 (13'), and a relation between the inclination angle "θ" and the corrected radiation angle "δ" is schematically shown. On this graph, straight line L0, which is parallel to the horizontal axis θ, shows a control characteristic when the vehicle speed is 0 km/h. Straight lines Li (i=1, 2, . . . ), which are rising to the right, respectively represent the control characteristics at vehicle speed Vi (i=1, 2, . . . , and "Vi<V(i+1)"). In this connection, the inclination angle θ is calculated by the steering angle of the steering wheel according to the detection signal sent from the steering sensor 11. A direction in which the vehicle body inclines to the left is determined to be a positive direction of θ. Concerning the correction radiation angle δ, a direction in which correction is made upward with respect to a horizontal face is determined to be a positive direction.

As shown in the drawing, all straight lines L0 and Li (i=1, 2, . . . ) pass through the origin (0, 0). Concerning straight line Li, its inclination (taper) is large when vehicle speed Vi is high.

Figure 8:
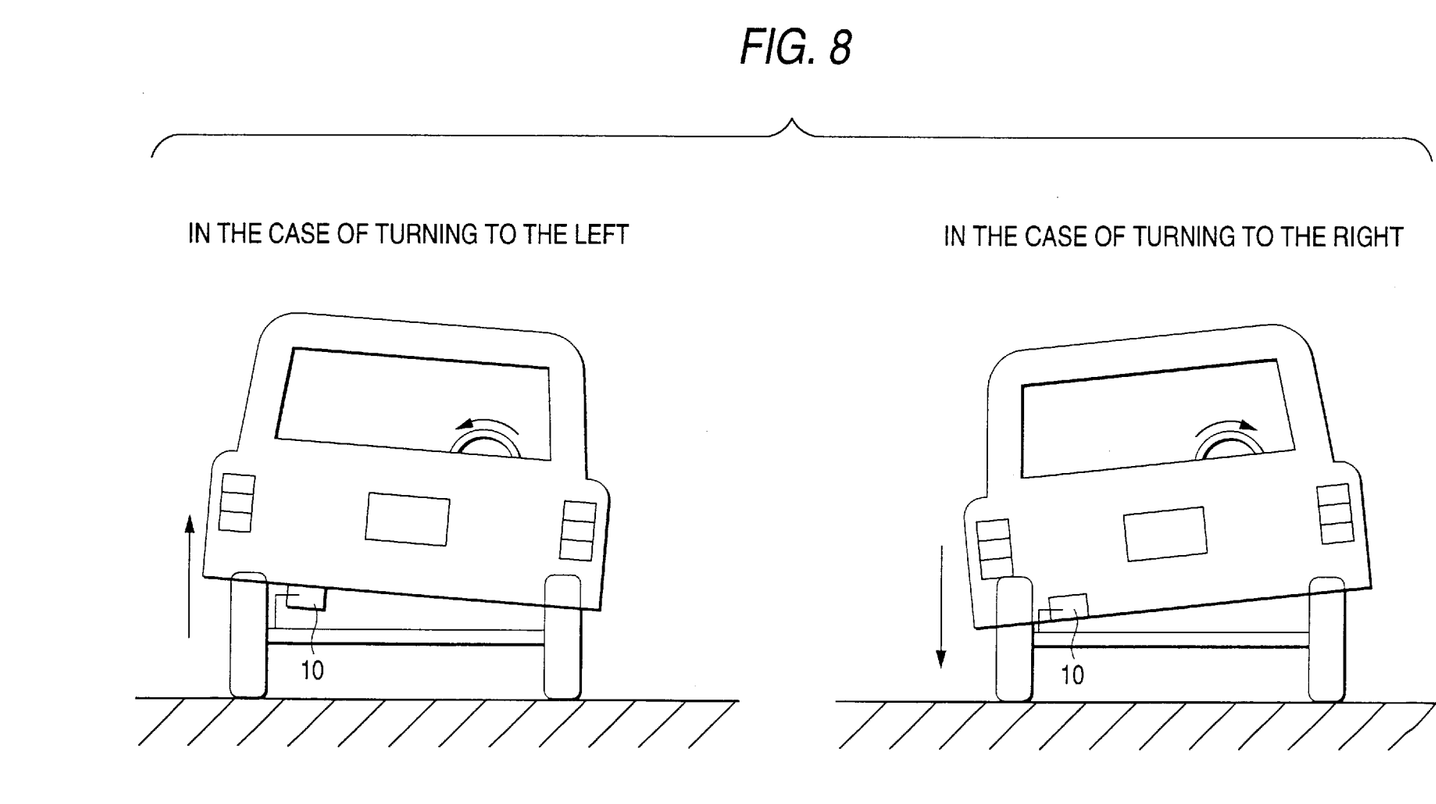
FIG. 8 is a schematic illustration showing a model of a turning state of a vehicle taken from the rear side of the vehicle.

FIG. 8 is a rear view schematically showing a vehicle, the attitude of which changes when the vehicle is turning. The left view shows an attitude of the vehicle which turns to the left, and the right view shows an attitude of the vehicle which turns to the right.

When the vehicle is turning to the left, the left vehicle body goes up. In this state, it results that ECU 8 corrects the radiating direction of the head lamp upward. In order to prevent the occurrence of the above problem, as shown in FIG. 7, the correction radiation angle is set at a value δ which corresponds to θ=−θa (negative value). For example, when the vehicle speed is V3 in the case where the vehicle is turning, the correction radiation angle is set at a value δ=−δa (negative value) which corresponds to point Qa on straight line L3. That is, the radiating direction is corrected downward with respect to the horizontal face. Due to the foregoing, the occurrence of a glare, which affects a vehicle coming from the opposed side, can be prevented.

On the other hand, when the vehicle is turning to the right, the left vehicle body goes down. In this state, it results that ECU 8 corrects the radiating direction of the head lamp downward. In order to prevent the occurrence of the above problem, as shown in FIG. 7, the correction radiation angle is set at a value δ which corresponds to θ=θb (positive value). For example, when the vehicle speed is V3 in the case where the vehicle is turning, the correction radiation angle is set at a value δ=δb (positive value) which corresponds to point Qb on straight line L3. That is, the radiating direction is corrected upward with respect to the horizontal face. Due to the foregoing, it is possible to prevent the visibility in the front of the vehicle from being impaired.

After ECU 8 has calculated control data corresponding to the thus obtained correction radiation angle δ, the program proceeds to step S20.

In step S11 shown in FIG. 5, it is judged whether or not vehicle speed V, which has been found in the previous step S7, is lower than threshold value "SV1", for example, it is judged whether or not vehicle speed V is lower than SV1=1 to 3 km/h. In other words, it is judged whether or not the vehicle is substantially stopped. When the vehicle is substantially stopped, the program proceeds to step S12, and control is conducted in such a manner that the radiation angle of the head lamp 13, 13' can be linear with respect to the pitch angle. After that, the program proceeds to step S18 shown in FIG. 6. When "V≧SV1", the program proceeds to the next step S13.

In step S13, it is judged whether or not acceleration A, which has been found in the previous step S8, is higher than the threshold value "SA1", for example, it is judged whether or not acceleration A is higher than SA1=3 to 5 m/s^2. When acceleration A is higher than SA1, the program proceeds to step S12. When "A≦SA1", the program proceeds to the next step S14.

In step S14, it is judged whether or not acceleration A is higher than threshold value "SA2", in this case "SA2<SA1", for example, it is judged whether or not acceleration A is higher than SA2=1 to 2 m/s^2. When acceleration A is higher than SA2, the program proceeds to step S15. When "A≦SA2", the program proceeds to the next step S16.

In step S15, an average of the pitch angle for a predetermined time is calculated, for example, an average of the pitch angle for T1=1 second is calculated, and control data corresponding to the average is obtained.

In step S16, it is judged whether or not vehicle speed V is lower than threshold value "SV2", in this case, SV2>SV1, and for example, SV2=10 to 30 km/h. When vehicle speed V is lower than threshold value "SV2", the program proceeds to step S17. When "V≧SV2", the program process to step S15.

In step S17, an average of the pitch angle for a predetermined time is calculated, for example, an average of the pitch angle for T2=5 seconds is calculated, that is, an average of the pitch angle for a longer period of time (T2>T1) than that of step S15 is calculated, and control data corresponding to the average is obtained.

As described above, in this embodiment, according to the intensities of vehicle speed V and acceleration A, there are provided three control modes shown in steps S12, S15 and S17. In step S18 shown in FIG. 6 succeeding to these steps, it is judged whether or not transfer has been made between the control modes. When transfer has been made between the control modes, the program proceeds to step S19, and the radiation angle of the head lamp 13, 13' is controlled over a predetermined period of time so that it can be linear with respect to the pitch angle. After that, the program proceeds to step S20. When the control mode is not transferred, the program directly proceeds to step S20.

In step S20, according to control data obtained in steps S10, S12, S15, S17 and S19, ECU 8 calculates data used for driving the actuator 12, 12'. Then, the program proceeds to step S21, and it is judge whether or not the head lamp switch 14 has been turned on. When the head lamp switch has been turned on, the program proceeds to the next step S22, and a signal corresponding to data used for driving is sent to the actuator 12, 12', so that the radiating direction of the head lamp 13, 13' is controlled. After that, the program returns to step S4 shown in FIG. 4. When the head lamp switch 14 has not been turned on, no operation is conducted and the program returns to step S4 shown in FIG. 4.

In this connection, in this embodiment, as shown in FIG. 7, the relation between the tilting angle θ and the correction radiating angle δ is approximated to a linear function. However, the relation between both of them can be generally expressed by a curve expression. For example, the relation of the correction radiating angle δ with respect to the tilting angle can be expressed by a curve expression. Accordingly, it is possible to accomplish various embodiments in which control characteristics of higher accuracy can be realized if necessary.

As described above, according to one embodiment of the present invention, the radiating direction of a lighting device can be corrected with respect to a change in the pitch angle of the vehicle while taking into account the inclination of the vehicle in the transverse direction. Therefore, it is possible to prevent the occurrence of a problem in which radiation control is conducted according to an erroneous detection of the pitch angle of the vehicle due to the transverse inclination of a vehicle. Accordingly, it is possible to prevent the occurrence of a glare to a vehicle coming from the opposed direction, and it is also possible to prevent the visibility from being impaired. As a result, the vehicle can be driven more safely.

According to another embodiment of the present invention, while a vehicle is turning, radiating direction control is conducted being restricted so that an unnecessary radiating direction control can not be conducted with respect to a change in the vehicle level.

According to yet another embodiment of the present invention, when the speeds of the right and left wheel are detected, it is possible to quickly grasp a state of turning by the behavior of the wheels in the case where the vehicle is turning.

According still another embodiment to the present invention, when a steering angle is detected, a turning state of a vehicle can be easily grasped.

According to yet another embodiment of the present invention, when an acceleration in the transverse direction of a vehicle is detected, a turning state of the vehicle can be accurately grasped by a centrifugal force given to the vehicle.

According to still another embodiment of the present invention, when a change in the rolling angle or the yawing angle is detected, an attitude of a vehicle including the pitch angle can be synthetically grasped.

What is claimed is:

1. A radiating direction control unit of a lighting device for vehicle use comprising:

level detection means for detecting a change in a level of a vehicle axle section of one of a front and a rear wheel of a vehicle and for emitting a signal corresponding to the detected level change of the vehicle axle, inclined attitude detection means for detecting an inclination of the vehicle in a direction transverse to a longitudinal direction of the vehicle and for emitting a signal corresponding to the detected inclination of the vehicle; and control means for determining a pitch angle of the vehicle based on the signal corresponding to the detected level change of the vehicle axle section and for correcting a radiating direction of the lighting device in accordance with the determined pitch angle and the detected inclination of the vehicle;

wherein the control means corrects the radiating direction of the lighting device in accordance with the determined pitch angle only when a change in the inclination of the vehicle in the transverse direction is not detected by the inclined attitude detection means.

2. The radiating direction control unit of a lighting device for vehicle use according to claim 1, wherein the inclined attitude detection means detects whether or not the vehicle is turning, and when the vehicle is turning, the control means stops controlling the radiating direction of the lighting device.

3. The radiating direction control unit of a lighting device for vehicle use according to claim 1, wherein the inclined attitude detection means detects whether or not the vehicle is turning, and when the vehicle is turning, the pitch angle of the vehicle is based on an average of vehicle level detecting signals obtained before turning of the vehicle is detected, and wherein the radiating direction of the lighting device is corrected according to the pitch angle.

4. The radiating direction control unit of a lighting device for vehicle use according to claim 1, wherein the inclined attitude detection means detects whether or not the vehicle is turning, and when the vehicle is turning, the radiating direction of the lighting device is corrected in accordance with an adjusted pitch angle equal to the pitch angle adjusted so as to cancel out a contributory component of the pitch angle representing the change in the level of the vehicle axle due to the turning of the vehicle.

5. The radiating direction control unit of a lighting device for vehicle use according to claim 2, wherein the inclined attitude detection means detects respective speeds of a right and a left wheel of the vehicle.

6. The radiating direction control unit of a lighting device for vehicle use according to claim 2, wherein the inclined attitude detection means detects a steering angle of the vehicle.

7. The radiating direction control unit of a lighting device for vehicle use according to claim 2, wherein the inclined attitude detection means detects an acceleration of the vehicle in the transverse direction.

8. The radiating direction control unit of a lighting device for vehicle use according to claim 2, wherein the inclined attitude detection means detects a change in one of a rolling angle and a yawing angle of the vehicle.

9. The radiating direction control unit of a lighting device for vehicle use according to claim 3, wherein the inclined attitude detection means detects respective speeds of a right and a left wheel of the vehicle.

10. The radiating direction control unit of a lighting device for vehicle use according to claim 3, wherein the inclined attitude detection means detects a steering angle of the vehicle.

11. The radiating direction control unit of a lighting device for vehicle use according to claim 3, wherein the inclined attitude detection means detects an acceleration of the vehicle in the transverse direction.

12. The radiating direction control unit of a lighting device for vehicle use according to claim 3, wherein the inclined attitude detection means detects a change in one of a rolling angle and a yawing angle of the vehicle.

13. The radiating direction control unit of a lighting device for vehicle use according to claim 4, wherein the inclined attitude detection means detects respective speeds of a right and a left wheel of the vehicle.

14. The radiating direction control unit of a lighting device for vehicle use according to claim 4, wherein the inclined attitude detection means detects a steering angle of the vehicle.

15. The radiating direction control unit of a lighting device for vehicle use according to claim 4, wherein the inclined attitude detection means detects an acceleration of the vehicle in the transverse direction.

16. The radiating direction control unit of a lighting device for vehicle use according to claim 4, wherein the inclined attitude detection means detects respective speeds of a right and a left wheel of the vehicle.

17. A radiating direction control unit of a lighting device for vehicle use comprising:

an axle level detector which detects a change in a level of a vehicle axle section of one of a front and a rear wheel of a vehicle and which emits a signal corresponding to the detected level change of the vehicle axle, a vehicle inclination detector which detects an inclination attitude of the vehicle in a direction transverse to a longitudinal direction of the vehicle and which emits a signal corresponding to the detected inclination of the vehicle; and a controller which determines a pitch angle of the vehicle based on the signal corresponding to the detected level change of the vehicle axle section and corrects a radiating direction of the lighting device in accordance with the determined pitch angle and the detected inclination attitude of the vehicle;

wherein the control means corrects the radiating direction of the lighting device in accordance with the determined pitch angle only when a change in the inclination of the vehicle in the transverse direction is not detected by the inclined attitude detection means.

18. A method of controlling a radiating direction of a lighting device for a vehicle, comprising the steps of:

determining a change in a level of a vehicle axle section of one of a front and a rear wheel of a vehicle and emitting a signal corresponding to the detected level change of the vehicle axle, detecting an inclination attitude of the vehicle in a direction transverse to a longitudinal direction of the vehicle and emitting a signal corresponding to the detected inclination of the vehicle, determining a pitch angle of the vehicle based on the signal corresponding to the detected level change of the vehicle axle section, and correcting a radiating direction of the lighting device in accordance with the determined pitch angle and the detected inclination attitude of the vehicle.

19. The method of controlling a radiating direction of a lighting device for a vehicle in accordance with claim 18, further comprising the step of correcting the radiating direction of the lighting device in accordance with an adjusted pitch angle equal to the pitch angle adjusted so as to cancel out a contributory component of the pitch angle representing the change in the level of the vehicle axle due to a turning of the vehicle.

20. A radiating direction control unit of a lighting device for vehicle use comprising:

a level detector that detects a change in a level of a vehicle section and that emits a signal corresponding to the detected level change of the vehicle section, a vehicle inclination detector that detects an inclination attitude of the vehicle in a direction transverse to a longitudinal direction of the vehicle and that emits a signal corresponding to the detected inclination of the vehicle; and a controller that determines a pitch angle of the vehicle based on the signal corresponding to the detected level change of the vehicle section and corrects a radiating direction of the lighting device in accordance with the determined pitch angle and the detected inclination attitude of the vehicle.

* * * * *